(12) United States Patent
Hennig

(10) Patent No.: US 9,789,730 B2
(45) Date of Patent: *Oct. 17, 2017

(54) STEER AXLE HIGH-TEMPERATURE WARNING SYSTEM

(71) Applicant: Equalaire Systems, Inc., Corpus Christi, TX (US)

(72) Inventor: Mark Kevin Hennig, Corpus Christi, TX (US)

(73) Assignee: Equalaire Systems, Inc., Corpus Christi, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,659

(22) Filed: Dec. 28, 2015

(65) Prior Publication Data
US 2016/0129728 A1 May 12, 2016

Related U.S. Application Data

(63) Continuation of application No. 14/536,326, filed on Nov. 7, 2014, now Pat. No. 9,254,712, which is a
(Continued)

(51) Int. Cl.
*B60C 23/10* (2006.01)
*B60B 35/00* (2006.01)
(Continued)

(52) U.S. Cl.
CPC .......... *B60B 35/003* (2013.01); *B60C 23/002* (2013.01); *B60C 23/003* (2013.01);
(Continued)

(58) Field of Classification Search
CPC .................................................. B60B 35/003
(Continued)

(56) References Cited

U.S. PATENT DOCUMENTS 1,054,504 A    2/1913   Burgraff, Jr.
1,072,907 A    9/1913   Brooks
(Continued)

FOREIGN PATENT DOCUMENTS

WO    WO2006/102017    9/2006
WO    WO2011/163274    12/2011
WO    WO2012/015669    2/2012

OTHER PUBLICATIONS

"IFS Series Independent Front Air-Ride Suspension Maintenance Manual," XL-AK397-01 Rev. C., SAF Holland, Inc., Oct. 2007, (32 pages).
(Continued)

*Primary Examiner* — Eric M Blount
(74) *Attorney, Agent, or Firm* — Pizarro Allen PC

(57) ABSTRACT

A high temperature warning system for a vehicle steer axle an air pressure supply, a normally-closed valve in fluid communication with pressure supply, a heat sensitive control capable of opening the normally-closed valve upon a predetermined temperature, the heat sensitive control mounted adjacent to the wheel end assembly in a heat exchange relationship therewith, and a warning system connected to the air pressure supply for actuation upon opening of the normally-closed valve.

34 Claims, 19 Drawing Sheets

Related U.S. Application Data continuation of application No. 13/808,940, filed as application No. PCT/US2011/044879 on Jul. 21, 2011, now Pat. No. 8,910,683.

(60) Provisional application No. 61/368,960, filed on Jul. 29, 2010.

(51) Int. Cl.

| | |
|---|---|
| *B60T 5/00* | (2006.01) |
| *B60T 17/22* | (2006.01) |
| *B60C 29/06* | (2006.01) |
| *B60C 23/00* | (2006.01) |
| *B60C 23/20* | (2006.01) |
| *F16K 17/38* | (2006.01) |

(52) U.S. Cl.
CPC .............. *B60C 23/20* (2013.01); *B60C 29/06* (2013.01); *B60T 5/00* (2013.01); *B60T 17/22* (2013.01); *F16K 17/383* (2013.01); *B60B 2900/731* (2013.01); *Y10T 137/1797* (2015.04); *Y10T 137/8158* (2015.04); *Y10T 137/8326* (2015.04)

(58) Field of Classification Search
USPC .......................... 340/438, 442; 152/415, 416
See application file for complete search history.

(56) References Cited

U.S. PATENT DOCUMENTS

| | | |
|---|---|---|
| 1,083,847 A | 1/1914 | McDowell et al. |
| 1,112,596 A | 10/1914 | Burggraf, Jr. |
| 1,165,057 A | 12/1915 | Bayly |
| 1,205,504 A | 11/1916 | Bearce |
| 1,800,780 A | 4/1931 | Daneel |
| 2,947,172 A | 8/1960 | King |
| 3,276,503 A | 10/1966 | Kilmarx |
| 4,387,931 A | 6/1983 | Bland |
| 4,685,501 A | 8/1987 | Williams |
| 4,700,763 A | 10/1987 | Williams |
| 4,883,106 A | 11/1989 | Schultz et al. |
| 5,377,736 A | 1/1995 | Stech |
| 5,584,949 A | 12/1996 | Ingram |
| 5,769,979 A | 6/1998 | Naedler |
| 5,868,881 A | 2/1999 | Bradley |
| 5,959,365 A | 9/1999 | Mantini et al. |
| 6,105,645 A | 8/2000 | Ingram |
| 6,131,631 A | 10/2000 | Bradley |
| 6,145,559 A | 11/2000 | Ingram, II |
| 6,283,186 B1 | 9/2001 | Krisher |
| 6,325,123 B1 | 12/2001 | Gao et al. |
| 6,325,124 B1 | 12/2001 | Colussi et al. |
| 6,394,556 B1 | 5/2002 | Ingram |
| 6,425,427 B1 | 7/2002 | Stech |
| 6,435,238 B1 | 8/2002 | Hennig et al. |
| 6,668,888 B1 | 12/2003 | Beesley et al. |
| 6,698,482 B2 | 3/2004 | Hennig et al. |
| 6,892,778 B2 | 5/2005 | Hennig et al. |
| 6,938,658 B2 | 9/2005 | Jarrett et al. |
| 7,273,082 B2 | 9/2007 | White et al. |
| 7,302,979 B2 | 12/2007 | Davison et al. |
| 7,416,005 B2 | 8/2008 | Hennig et al. |
| 7,652,562 B2 | 1/2010 | White et al. |
| 7,690,412 B1 | 4/2010 | Jenkinson et al. |
| 2004/0000364 A1* | 1/2004 | Hennig .................. B60C 23/003 152/417 |
| 2004/0173296 A1 | 9/2004 | White et al. |
| 2006/0207705 A1* | 9/2006 | Davison .................. G01P 3/443 152/415 |
| 2007/0227640 A1 | 10/2007 | Ingram |
| 2009/0283190 A1 | 11/2009 | Padula et al. |
| 2009/0284362 A1* | 11/2009 | Wilson .................. B60C 23/003 340/449 |

OTHER PUBLICATIONS

International Preliminary Report on Patentability issued in corresponding PCT Patent App. No. PCT/US2011/044879 dated Jan. 29, 2013, (7 pages).
International Search Report and Written Opinion issued in corresponding PCT Patent App. No. PCT/US2011/044879 fated Dec. 9, 2011 (7 pages).

* cited by examiner

US 9,789,730 B2

STEER AXLE HIGH-TEMPERATURE WARNING SYSTEM

CROSS-REFERENCE TO RELATED APPLICATION DATA

This application is a continuation of U.S. patent application Ser. No. 14/536,326 filed Nov. 7, 2014, which is a continuation of U.S. patent application Ser. No. 13/808,940 filed Apr. 23, 2013, which issued as U.S. Pat. No. 8,910,683 on Dec. 16, 2014, which claims priority of PCT Patent Application No. PCT/US2011/044879 filed on Jul. 21, 2011, which claims priority to U.S. Provisional Patent Application No. 61/368,960 entitled "Steer-Axle High-Temperature Warning System" filed Jul. 29, 2010, all of which are hereby incorporated in their entirety by reference.

FIELD

The disclosed system relates generally to high temperature warning systems for vehicle steer axles.

BACKGROUND

In the event of a failure associated with the wheel end, such as a bearing failure or brake failure, elements of the wheel end can heat up and reach high temperatures very quickly. When these high temperatures are reached by the wheel end, tires and/or lubricant may ignite and cause the wheel to lock up or the vehicle to burn. Due to the intense heat caused by a wheel end failure, it is also possible that the wheel can detach from the axle.

SUMMARY

A high temperature warning system for a steer-axle wheel end assembly, the system comprising: an air pressure supply, a normally-closed valve in sealed fluid communication with the air pressure supply, a heat sensitive control capable of opening the normally-closed valve upon a predetermined temperature, the heat sensitive control mounted on or near the steer-axle wheel end assembly in a heat exchange relationship therewith, and a warning indicator connected to the air pressure supply for actuation upon opening of the normally-closed valve.

An automatic tire inflation and high-temperature warning system for a steer-axle wheel end assembly comprising a spindle, bearings mounted to the spindle, a hub rotatably mounted to the bearings, a wheel mounted to the hub, and a pneumatic tire mounted to the wheel, the system comprising: an air pressure supply, a rotary union mounted to the spindle and in sealed communication with the air pressure supply and with the tire, a normally-closed valve in sealed fluid communication with the air pressure supply, a heat sensitive control capable of opening the normally-closed valve upon a predetermined temperature, the heat sensitive control mounted on or near the steer-axle wheel end assembly in a heat exchange relationship therewith, and a warning indicator connected to the air pressure supply for actuation upon opening of the normally-closed valve.

A high temperature warning system for a steer-axle wheel end assembly, the system comprising: a normally-closed valve capable of sealed fluid communication with an air pressure supply, a heat sensitive control mountable on or near the steer-axle wheel end assembly in a heat exchange relationship therewith, and capable of connecting to the normally-closed valve and opening the normally-closed valve upon a predetermined temperature, and warning indicator connected to the air pressure supply for actuation upon opening of the normally-closed valve.

A high temperature warning system for a steer-axle wheel end assembly, the system comprising: an air pressure supply, a electrically-operated normally-closed valve in sealed fluid communication with the air pressure supply, a thermal electric switch capable of opening the normally-closed valve upon a predetermined temperature, the thermal electric switch mounted on or near the steer-axle wheel end assembly in a heat exchange relationship therewith, and a warning indicator connected to the air pressure supply for actuation upon opening of the electrically-operated normally-closed valve.

DETAILED DESCRIPTION

Figure 1:
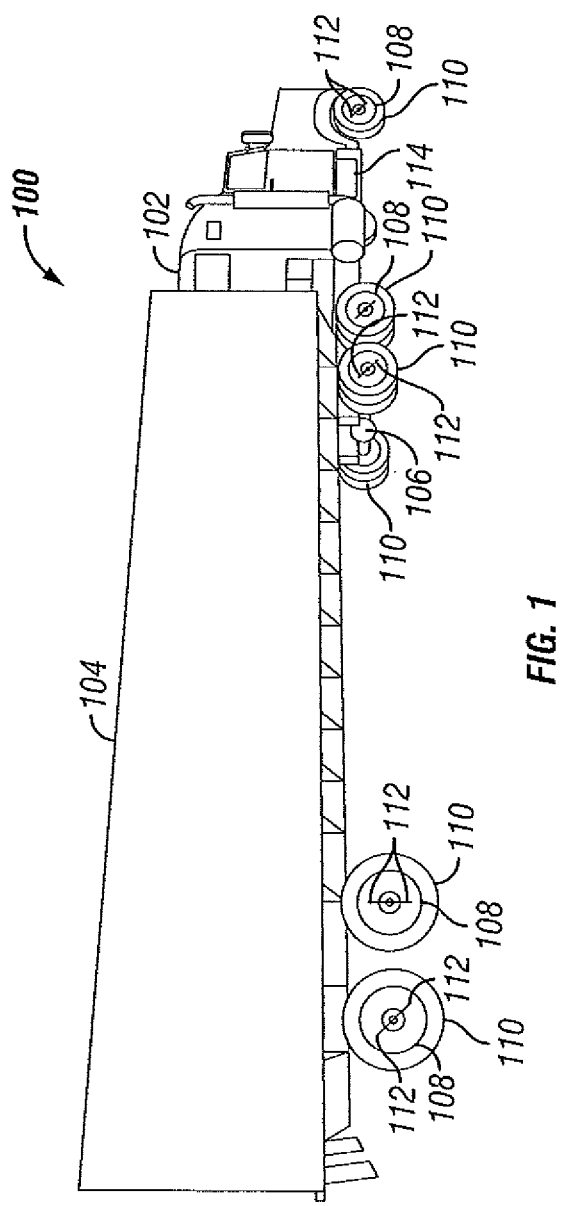
FIG. 1 illustrates one embodiment of a vehicle that may use a steer-axle high-temperature warning system.

As may be seen in FIG. 1, a vehicle 100 may comprise a truck 102 and trailer 104. The truck 102 may include one or more drive axles 106 as part of the vehicle's powertrain. The truck 102 may further include a steer axle 114 having pivoting hubs that provide steering capability for the vehicle 100. The trailer 104 may include one or more fixed axles (not shown). Each axle may have one or more wheels 108 mounted thereto with a tire 110 mounted to each wheel 108. Of course, other types of steerable vehicles, such as cars and buses may be provided with the high temperature warning system disclosed herein.

The vehicle 100 may be provided with a pressurized air supply (not shown) used to provide pressurized air to brakes (not shown) and/or to an automatic tire inflation system (indicated with air hoses 112). The steer-axle high-temperature warning system (shown in more detail in FIGS. 4-19) may warn a driver when the steer axle 114 and/or steer axle wheel end reach a predetermined temperature.

Figure 2:
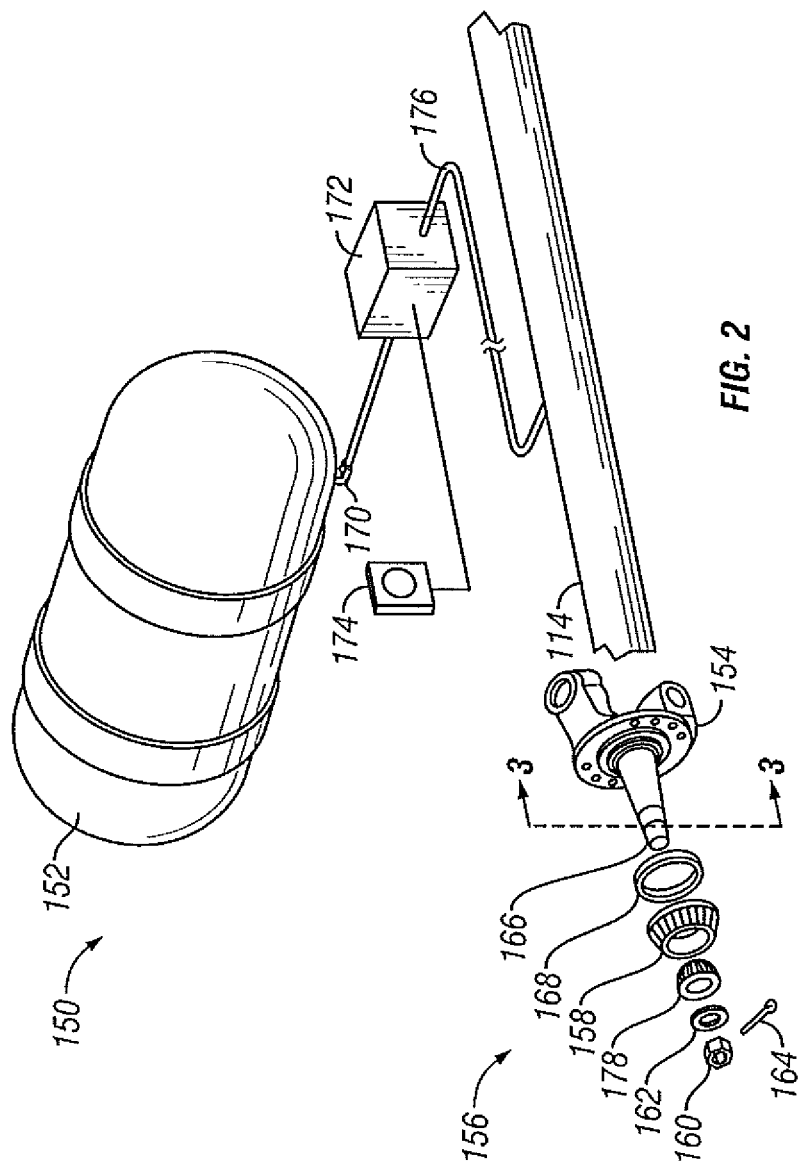
FIG. 2. illustrates an exploded view of one embodiment of a steer-axle high-temperature warning system.

Referring now primarily to FIG. 2, a vehicle may include a wheel-end high-temperature warning system 150 and a steer axle 114 having a wheel spindle 154 on which a wheel end assembly 156 may be mounted. The wheel end assembly 156 may include a hub (not shown) which may rotate on inner bearings 158 and outer bearings 178. A wheel 108, tire 110 (as shown in FIG. 1) and hubcap may be mounted to the hub. A brake drum (not shown) may be integrally formed with the hub, or otherwise mounted to the hub. The wheel end assembly 156 may also include other suitable parts which are not shown but may be monitored by the wheel-end high-temperature warning system 150.

The outer bearings 178 may be retained on the wheel spindle 154 by a spindle nut 160. A washer 162 may be mounted between the spindle nut 160 and outer bearing 178. A cotter pin 164 may be inserted through a receiving hole 166 in the end of the wheel spindle 154 so as to prevent the spindle nut 160 from becoming unscrewed from the wheel spindle 154. The wheel spindle 154 may be pivotally mounted to the front steer axle 114 via a knuckle post assembly (not shown).

An oil seal 168 may be mounted to the wheel spindle 154 adjacent the inner bearing 158 so as to prevent loss of lubricant through the inner bearing 158. A hub cap 606 (as shown in FIGS. 16-19) may be mounted to the hub, thus generally sealing the bearings 158 and 178 from debris and preventing loss of lubrication.

If the bearings 158 and 178, brakes, or other elements of the wheel end fail, the temperature in the bearings 158 and 178, brake drum, wheel spindle 154, or other wheel end elements may reach in a temperature high enough to ignite the tires 110 and bearing lubricant. Such heat may also be sufficiently high to cause the wheel end assembly 156 to detach from the wheel spindle 154. The disclosed high-temperature warning system may warn the vehicle operator of high temperatures well before the tires ignite or bearings melt, or some other dangerous high-temperature related condition arises in the wheel-end.

The high-temperature warning system 150 may include an air pressure supply 152, such as that typically provided on a truck 102 or vehicle 100 for various purposes such as air brakes; a pressure protection valve 170; a flow switch 172; and an indicator or warning system light 174. An air conduit 176 may connect the air pressure supply 152 to one or more normally-closed valves 256 (as shown in the embodiments of FIGS. 4-19).

Figure 3:
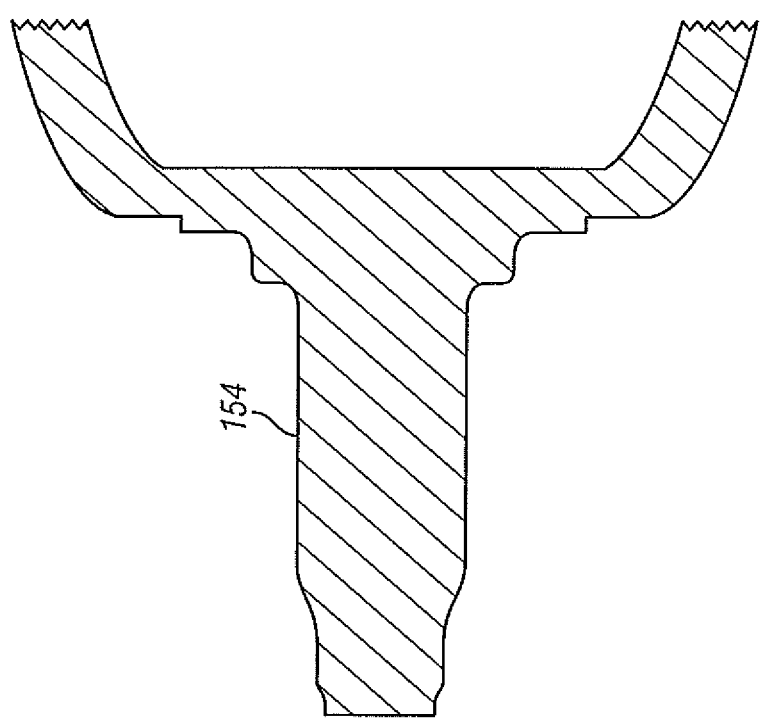
FIG. 3 illustrates a cut-away view of one embodiment of a wheel spindle.

FIG. 3 shows a cross section of the exemplary wheel spindle 154 of FIG. 2. As may be seen in FIG. 4, the air conduit 176 may be connected to a valve block 252 mounted to the inner face 254 of the wheel spindle 154. In some embodiments, the valve block 252 may be comprised of metal or any other suitable thermally-conductive material, and may mounted to the wheel spindle 154, such as by threadable attachment. The valve block 252 may be suitably configured so as to allow the valve block 252 to remain at or near the temperature of the wheel spindle 154 when mounted thereto. A normally-closed valve 256 may be mounted to the valve block 252 in fluid communication with the air conduit 176 through a channel 262 which connects the air conduit 176 with the normally-closed valve 256.

The normally-closed valve 256 may be opened by a heat sensitive control. In one embodiment, the heat sensitive control may be configured to detect temperature and to open the normally-closed valve 256 when a predetermined temperature is measured. A pre-determined temperature may be, for example, a temperature well below the softening or melting point of the bearing materials, or well below the tire melting point. The pre-determined temperature may be set well above the maximum temperatures at which a wheel-end assembly may normally operate so as to avoid false alarms. Thus, when the temperature near the hear sensitive control reaches the predetermined temperature, the heat sensitive control will open the normally-closed valve 256 to allow air to pass through the normally-closed valve 256.

Figure 4:
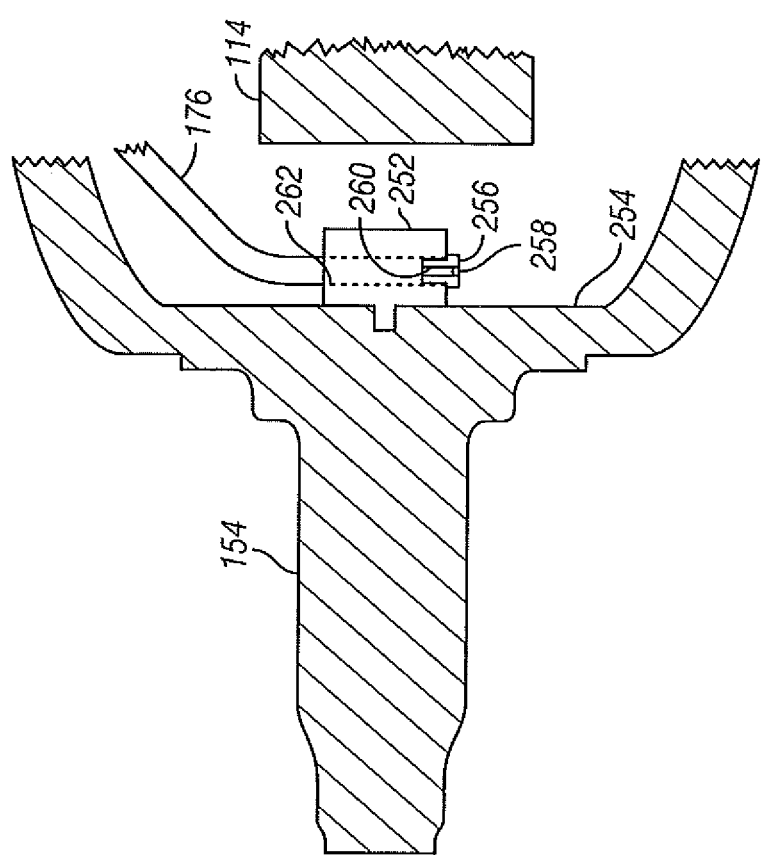
FIG. 4 illustrates a cut-away side view of one embodiment of a steer-axle high-temperature warning system.

The heat sensitive control may be any device which is capable of detecting temperature and either directly or indirectly opening a normally-closed valve in response thereto. For example, in some embodiments, the heat sensitive control is fusible plug 258, a thermally electric switch 552, or any other suitable control. The normally-closed valve 256 and the heat sensitive control may be located at separate locations on the vehicle 100. The heat sensitive control may be mounted in or near the wheel-end assembly in a heat-exchange relationship therewith. In some embodiments the heat sensitive control may be in a conductive heat exchange relationship with the wheel end assembly such that the heat sensitive control detects the approximate temperature of wheel end assembly or specific components thereof, such as the bearings or brakes. For example, the heat sensitive control may be mounted near the wheel end assembly 156 while the normally-closed valve 256 is mounted at or near the air pressure supply 152. In other embodiments, the heat sensitive control may be mounted near the wheel end assembly 156 while the normally-closed valve 256 is mounted at another point on or near the wheel end assembly 156, for example as shown in FIGS. 10-15 and 19. In other embodiments, the heat sensitive control may be included within the normally-closed valve 256 and both the heat sensitive control and the normally-closed valve 256 may be located at the same position at or near the wheel end assembly 156. For example, in the embodiments of FIGS. 4-9 and 17-18, the heat sensitive control is contained within the normally-closed valve 256. In FIGS. 4-9 and 17-18, the heat sensitive control is a fusible plug 258 comprising of a eutectic alloy. In one embodiment, the fusible plug 258 is placed within an aperture 260 within the normally-closed valve 256. The fusible plug 258 may seal the aperture 260 by being located within the aperture 260, as shown in FIG. 4. The fusible plug 258 may open the normally-closed valve 256 upon a predetermined temperature by melting sharply at the predetermined temperature and thus un-sealing the aperture 260 in the normally-closed valve 256. Thus, the fusible plug 258 may be automatically removed from the aperture 260 when the predetermined temperature is reached, thus opening the normally-closed valve 256. While any type of fusible plug 258 may be satisfactorily used, one sold under the trademark LEEKPRUF sold by the Mueller Refrigeration Company, Inc., is suitable. In some embodiments, when the eutectic alloy of the fusible plug 258 melts, air may escape from the air pressure supply 152 through the normally-closed valve 256 via air conduct 176. The escaping air may be detected by the flow switch 172, which may actuate the warning system light 174 showing FIG. 1. The warning system light 174 may be positioned within view of the driver of the vehicle 100 to indicate a problem. In other embodiments, air may escape when the normally-closed valve 256 is automatically opened, for example, by a thermal electric switch.

As may be seen in the embodiments of FIGS. 5-19, one or more normally-closed valves 256 may be provided in various combinations and at various exemplary locations. Other types of thermally operated, normally-closed valves 256 and heat sensitive controls may also be used. For example, the heat sensitive control may be a thermal electric switch 552 which actuates an electrically-operated normally-closed valve 256 upon a predetermined temperature, as shown in FIGS. 10-15 and 19. The thermal electric switch 552 may actuate the electrically-operated normally-closed valve 256 by sending an electric signal via wire or wirelessly to the electrically-operated normally-closed valve 256 when the thermal electric switch 552 reaches a predetermined temperature. The electrically-operated normally-closed valve 256 may then receive the signal and open the normally-closed valve 256. Thus, in some embodiments, the normally-closed valve 256 includes the heat sensitive control 57 (as shown in FIGS. 4-9 and 16-18) while in other embodiments, the heat sensitive control 57 may be located remotely from the normally-closed valve 256 and may communicate (electronically or otherwise) with and open the normally-closed valve 256 (as shown in FIGS. 10-15 and 19).

Figure 5:
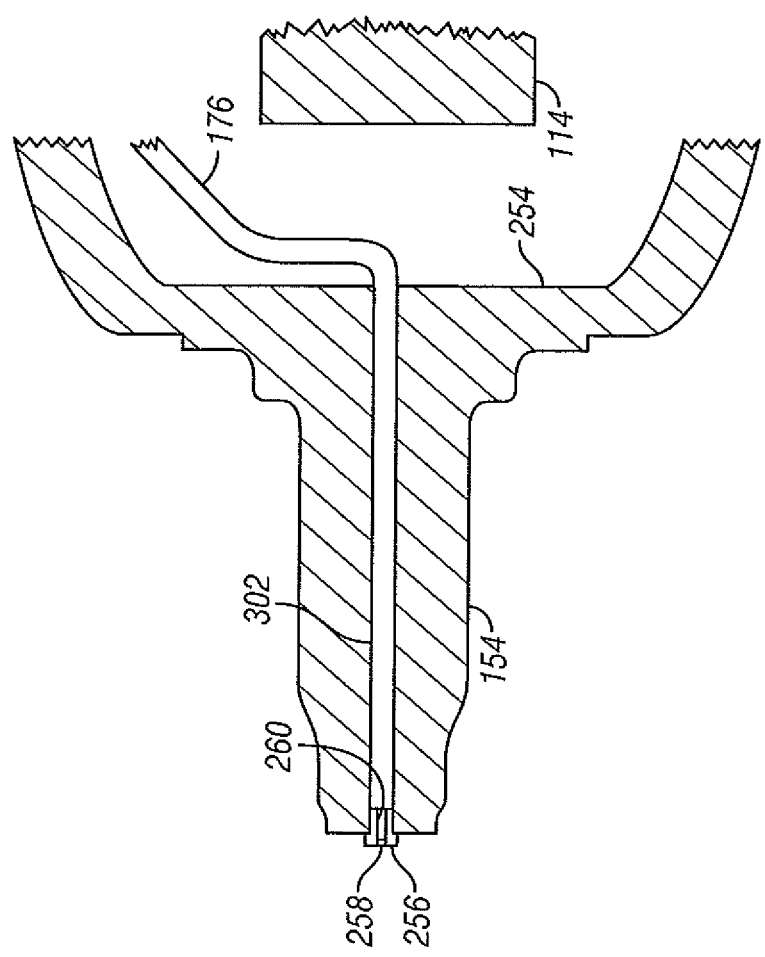
FIG. 5 illustrates a cut-away side view of another embodiment of a steer-axle high-temperature warning system.

In the embodiment of FIG. 5, the wheel spindle 154 may be bored along its central axis to provide an axial channel 302 in fluid communication with the air conduit 176. A normally-closed valve 256 containing the heat sensitive control, in this embodiment a fusible plug 258 comprising a eutectic alloy, may be threadably mounted in the axial channel 302 at the outer end of the spindle 154. The air conduit 176 may be sealingly connected to the axial channel 302 at the inner face 254 of the spindle 154, or may extend through the axial channel 302 and sealingly connect to the normally-closed valve 256. In some embodiments, when the wheel spindle 154 or surrounding wheel end assembly 156 elements reach a predetermined temperature, the eutectic alloy may melt and open the aperture 260 in the normally-closed valve 256 such that air from the air conduit 176 flows through the aperture 260. A pre-determined temperature may be, for example, a temperature substantially below the temperature at which bearing lubricant burns or bearings melt.

Figure 6:
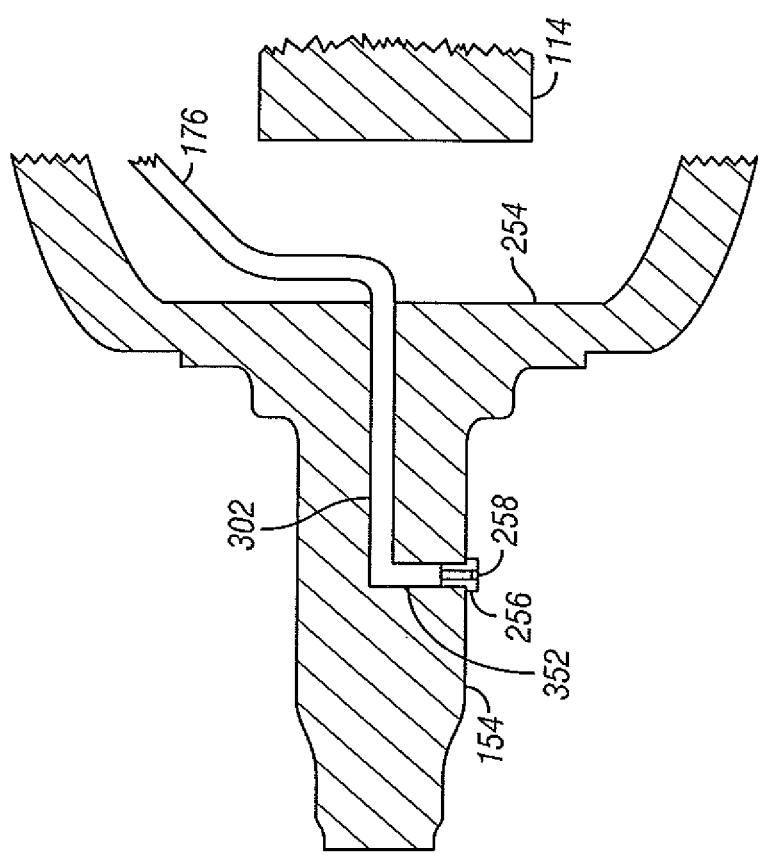
FIG. 6 illustrates a cut-away side view of another embodiment of a steer-axle high-temperature warning system.

In the embodiment of FIG. 6, a radial channel 352 may extend from the axial channel 302 to an external surface of the spindle 154 so as to allow mounting of a normally-closed valve 256 adjacent the inner bearings 158 and/or outer bearings 178 (shown in FIG. 2). The normally-closed valve 256 may be sealingly mounted in the radial channel 256 at the external surface of the spindle so as to be in fluid communication with the air conduit 176 such that when the normally-closed valve 256 is opened, air from the air conduit 176 can escape through the normally-closed valve 256. As shown in the embodiment of FIG. 6, the air conduit 176 may be sealingly connected from the air pressure supply 152 to the inner face 254 of the wheel spindle 154 so as to supply pressurized air to a normally-closed valve 256 without need for a valve block 252. In some embodiments, the air conduit 176 may be inserted through the axial channel 302 and/or radial channel 352 to sealingly connect with the normally-closed valve 256 so as to allow sealed fluid communication from the air pressure supply 152 to the normally-closed valve 256.

Figure 7:
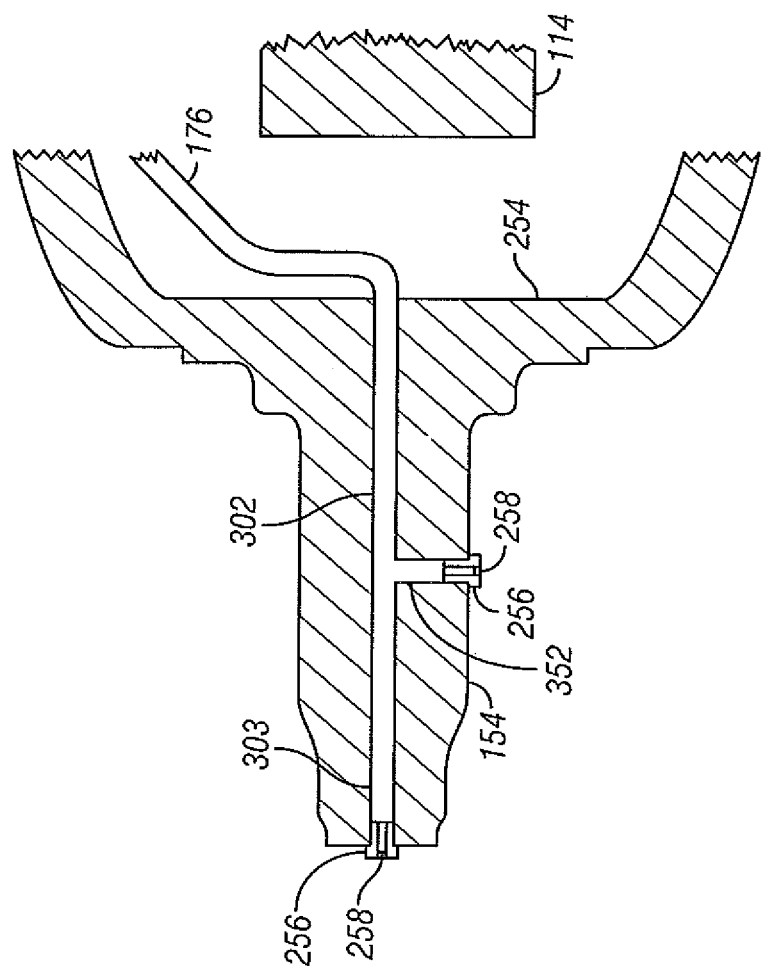
FIG. 7 illustrates a cut-away side view of another embodiment of a steer-axle high-temperature warning system.

In the embodiment of FIG. 7, normally-closed valves 256 may be located at one end 303 of the axial channel 302 and in the radial channel 352. The embodiment of FIG. 7 may not include a valve block 252 but rather the air conduit 176 may sealingly connect to the axial channel 302. Of course, the air conduit 176 may also extend through the axial and radial channels for sealing connection directly with the normally-closed valves. In this embodiment, the heat sensitive control 258 may be contained within the normally-closed valve 256 and may comprise a fusible plug 258 made of a eutectic alloy.

Figure 8:
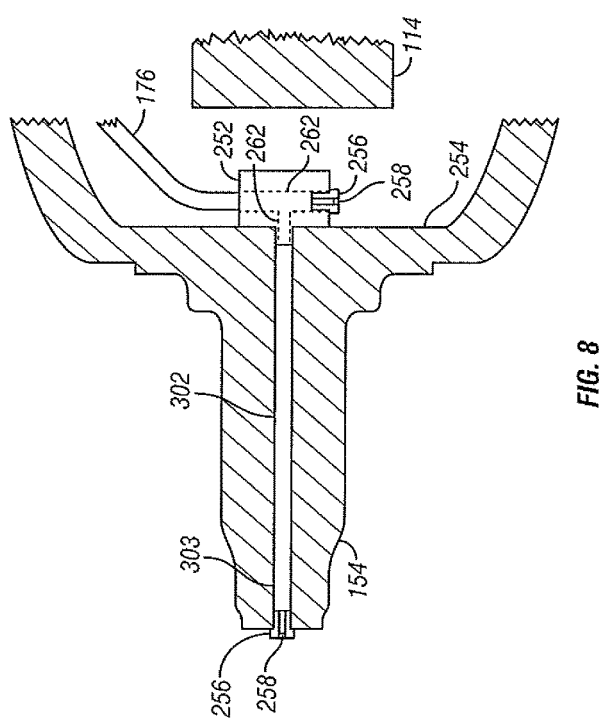
FIG. 8 illustrates a cut-away side view of another embodiment of a steer-axle high-temperature warning system.

In the embodiment of FIG. 8, the air conduit 176 may sealingly connect with the valve block 252. Normally-closed valves 256 may be located at one end 303 of the axial channel 302 and in valve block 252. The valve block 252 may include channels 262 which allow the air conduit 176 to fluid communication with the axial channel 302 and the normally-closed valves 256. In this embodiment, the heat sensitive control 258 may be contained within the normally-closed valve 256 and may comprise a fusible plug 258 made of a eutectic alloy.

Figure 9:
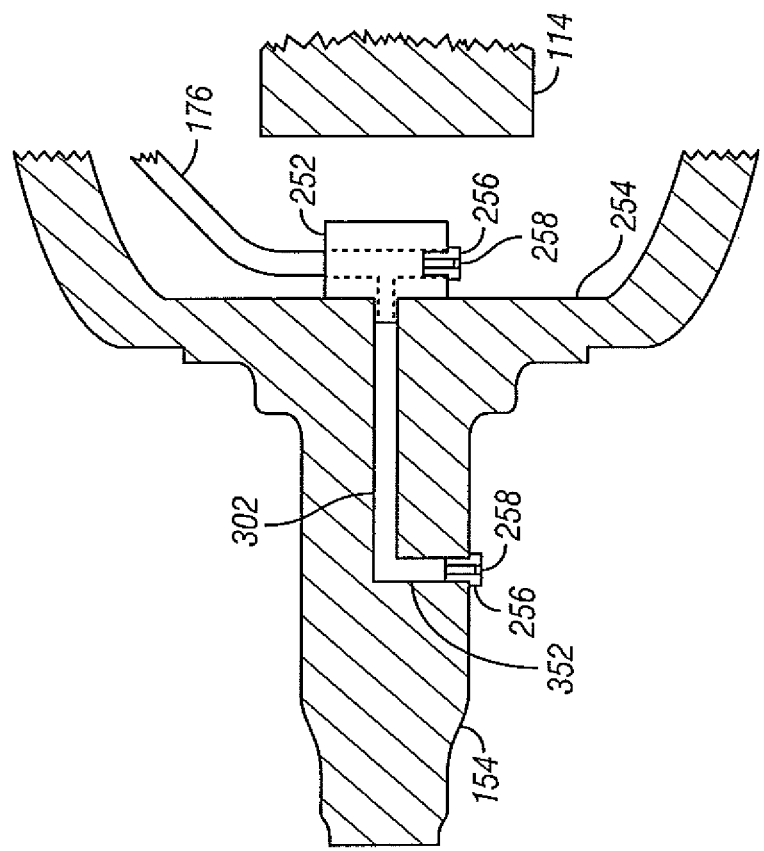
FIG. 9 illustrates a cut-away side view of another embodiment of a steer-axle high-temperature warning system.

In the embodiment of FIG. 9, normally-closed valves 256 may be mounted in the radial channel 352 in the valve block 252. In this embodiment, the heat sensitive control 258 may be contained within the normally-closed valve 256 and may comprise a fusible plug 258 made of a eutectic alloy.

In some embodiments, the air conduit 176 may sealingly connect the air pressure supply 152 to the valve block 252 (as shown in FIG. 9) or axial channel 302 of the wheel spindle 154 (as shown in FIGS. 5-7). In some embodiments, the air conduit 176 may run through a hollow front steer axle 114. In some embodiments, the air conduit 176 may run alongside the front steer axle 114. In some embodiments, the hollow front steer axle 114 may be bored or plugged at each end (not shown), and the air conduit 176 may be connected to the hollow front steer axle 114 so as to use the hollow front steer axle 114 as part of the air conduit or pressure supply. An air line (not shown) may extend from an axle plug (not shown) to the valve block 252 or inner face 254 of the wheel spindle 154 to provide fluid communication between the air pressure supply 152 and the normally-closed valves 256.

Figure 10:
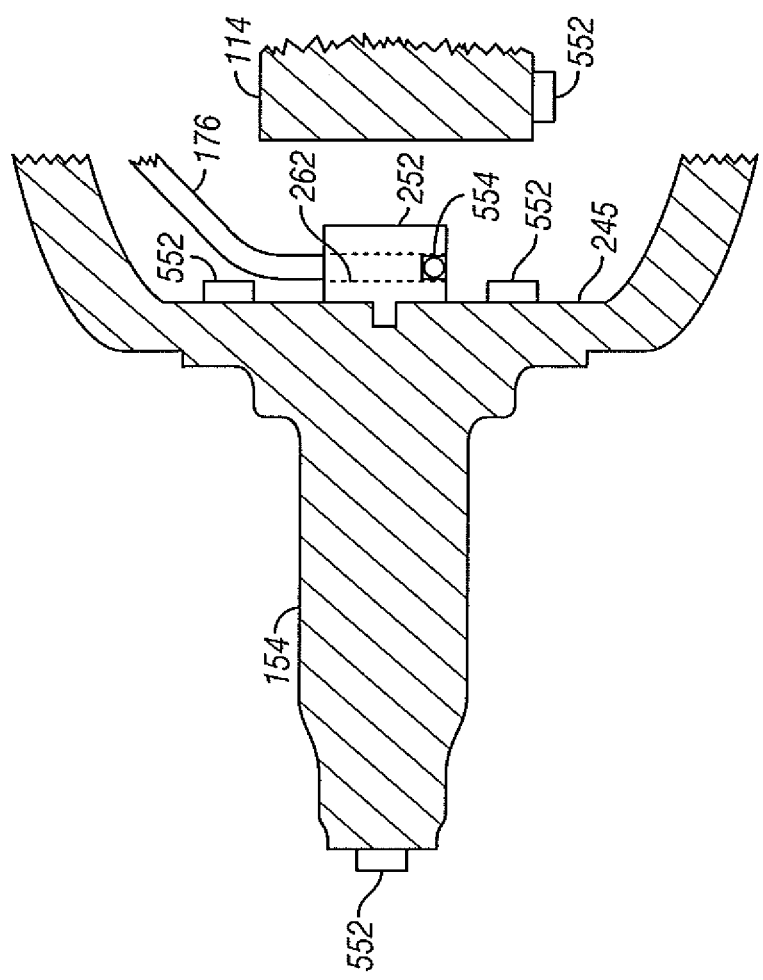
FIG. 10 illustrates a cut-away side view of another embodiment of a steer-axle high-temperature warning system.

Referring now to FIGS. 10-15, the heat sensitive control may be a thermal electric switch 552 which operates an electric-operated normally-closed valve 554 mounted in a valve block 252 similarly to the valves of previous embodiments. The thermal electric switch 552 and the electric-operated normally-closed valve 554 may each include a power source, may receive power from an external power source or may not need a power source. In the embodiment of FIG. 10, thermally electric switches 552 may be mounted at a variety of locations at or near the wheel end assembly 156. For example, a thermally electric switch 552 may be located at the end of the wheel spindle 154. Other thermally electric switches 552 may be located on an inner face 254 of the wheel spindle 154. Yet another thermal electric switch 552 may be located on the steer axle 114. Each thermal electric switch 552 may communicate with the normally-closed valve 256 which may be an electric-operated normally-closed valve 554. In some embodiments, when any one of the thermally electric switches 552 reaches a predetermined temperature, it will send a signal to the electric-operated normally-closed valve 554 to cause the electric-operated normally-closed valve 554 to open. In other embodiments, the thermally electric switches 552 may communicate with each other or a central processing unit, and may be configured to communicate with the electric-operated normally-closed valve 554 when a certain number of thermal electric switches 552 have reached a predetermined temperature.

Figure 11:
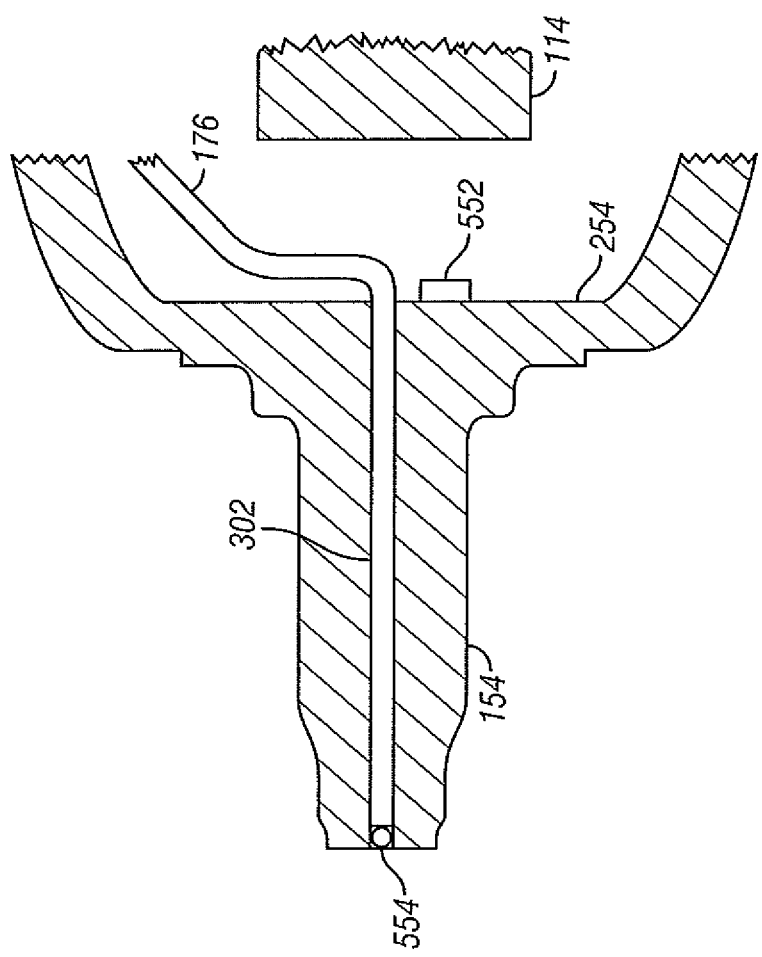
FIG. 11 illustrates a cut-away side view of another embodiment of a steer-axle high-temperature warning system.
Figure 12:
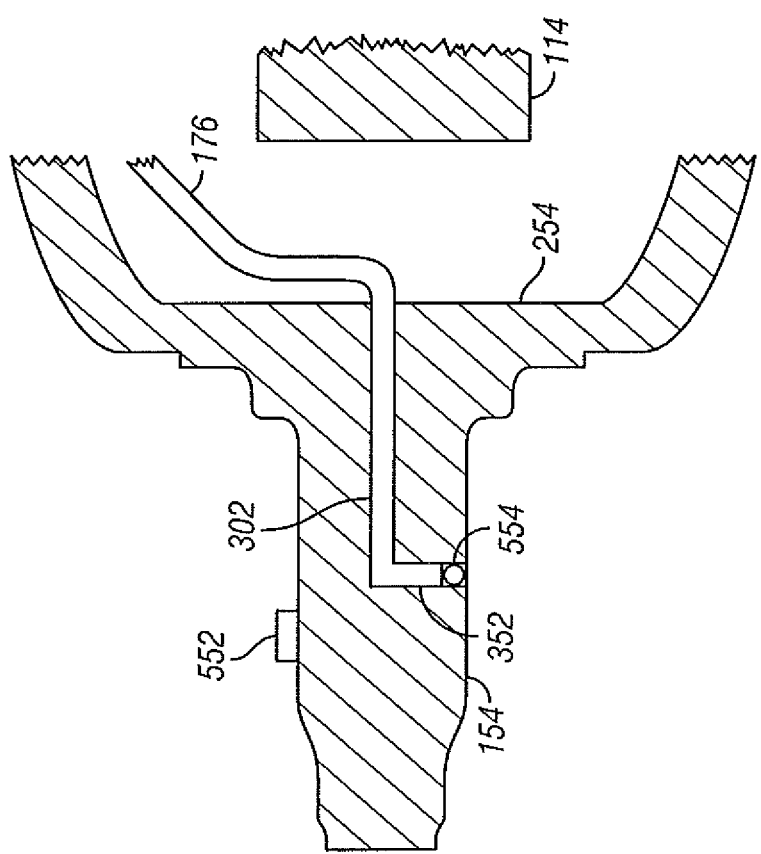
FIG. 12 illustrates a cut-away side view of another embodiment of a steer-axle high-temperature warning system.
Figure 13:
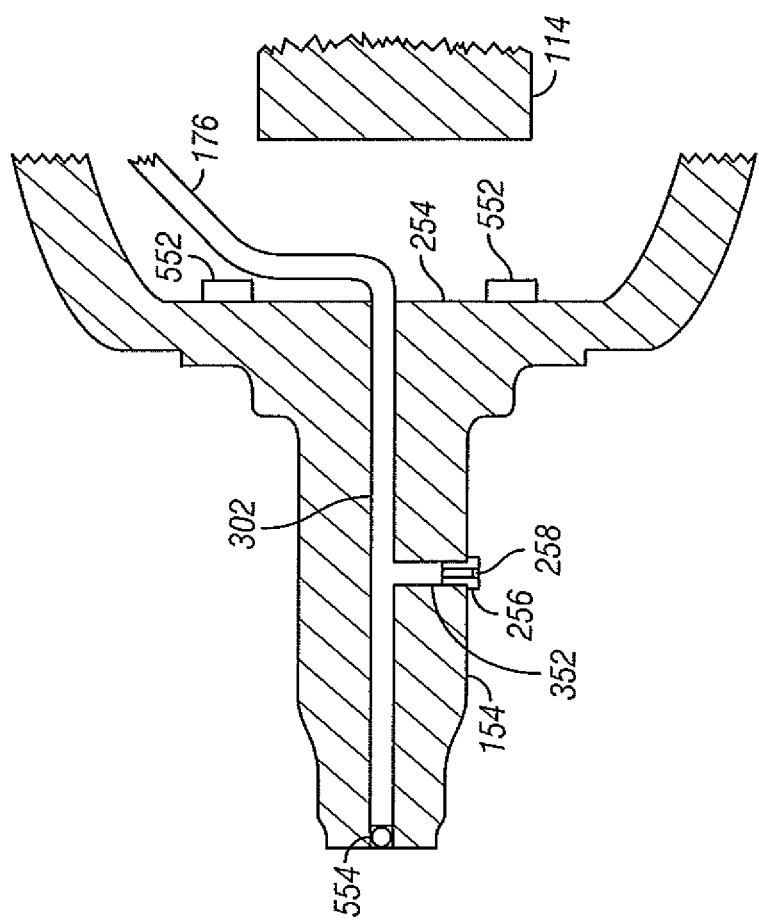
FIG. 13 illustrates a cut-away side view of another embodiment of a steer-axle high-temperature warning system.
Figure 14:
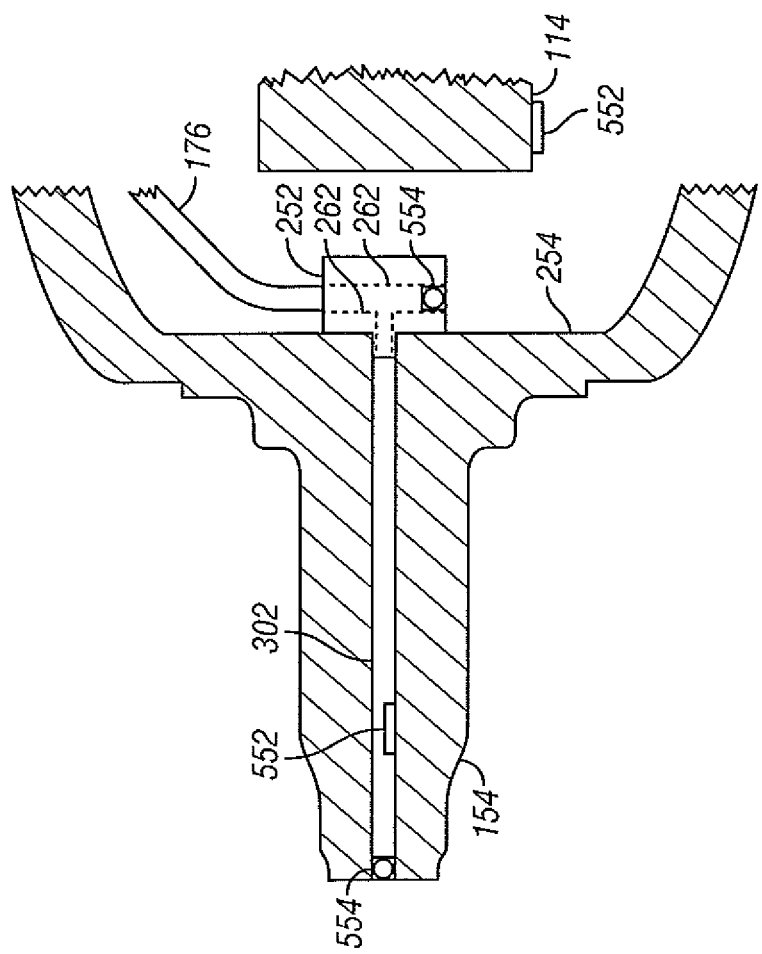
FIG. 14 illustrates a cut-away side view of another embodiment of a steer-axle high-temperature warning system.
Figure 15:
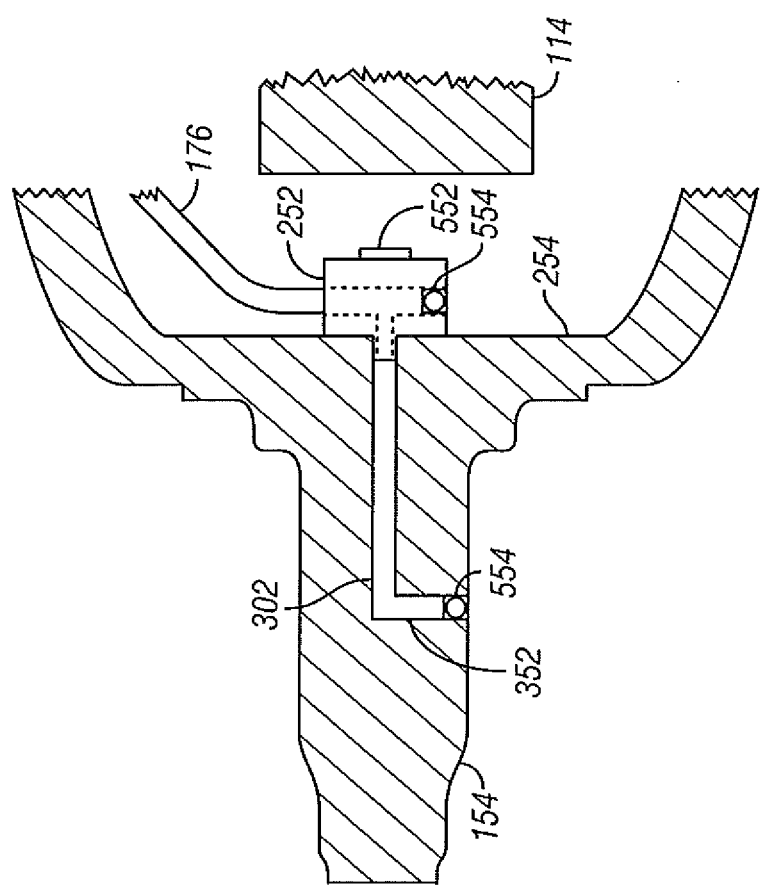
FIG. 15 illustrates a cut-away side view of another embodiment of a steer-axle high-temperature warning system.

The embodiment of FIG. 11 includes one electric-operated normally-closed valve 554 which is located in the axial channel 302 and a thermal electric switch 552 which is located on the inner face 254 of the wheel spindle 154. The embodiment of FIG. 12 includes one electric-operated normally-closed valve 554 which is located in the radial channel 352 and one thermal electric switch 552 which is located on the wheel spindle 154. The embodiment of FIG. 13 includes two thermally electric switches 552 which are located on the inner face 254 of the wheel spindle 154 and one electric-operated normally-closed valve 554 is located in the axial channel 302. The embodiment of FIG. 13 also includes one normally-closed valve 256 including a fusible plug 258 made of a eutectic alloy which is located in the radial channel 352. The embodiment of FIG. 14 includes two electric-operated normally-closed valves 554 and two electric-operated normally-closed valves 554, one which is located in the axial channel 302 and one which is located on the steer axle 114. The embodiment of FIG. 15 includes two thermally electric switches 552, one which is located in the radial channel 352 and one which is located in the valve block 252, and one thermally electric switch 552 which is located on the valve block 252.

Of course, the number and locations of thermal electric switches 552 in the foregoing embodiment should not be viewed as limiting. Other embodiments may include fewer or additional thermally electric switches and normally-closed valves in a variety of other locations in and about the wheel end assembly. Likewise, thermally-operated normally-closed valves may be used in combination with fusible plug normally-closed valves. The valve block 252 may be of any suitable configuration adapted for mounting to the wheel spindle, whether at the inner face 254 or elsewhere. The valve block 252 may be further provided with one or more channels 262 to allow fluid communication from air conduit 176 to one or more normally-closed valves. Furthermore, the radial channel 352 may extend from the axial channel 302 at any point along the axial channel 302. A wheel spindle may have formed therein more than one axial channel 302 and may have formed therein more than one radial channel 352.

The high temperature warning system may provide a stand-alone system for vehicles, or the warning system may be easily adapted for use with an automatic tire inflation system which may also use the air pressure supply 152 and a warning system light 174 shown in FIG. 1. The high temperature warning system may be used with various types of automatic tire inflation systems, one type of which is shown in the embodiments of FIGS. 16-19 and more fully described and illustrated in U.S. Pat. No. 6,698,482, entitled "Rotary Air Connection With Bearing For Tire Inflation System," which is hereby incorporated by reference. As shown in FIG. 1, the automatic tire inflation system may be used to control air pressure in one or more of the tires 110 mounted to steer axle 114, drive axle 106 and trailer axles (not shown). The automatic tire inflation system may include one or more air hoses 112 in fluid communication with each tire 110. Other automatic tire inflation systems, such as without limitation those disclosed in U.S. Pat. Nos. 7,273,082, 6,325,124, and 6,105,645, and U.S. Pub. App. No. 2009/0283190.

Figure 16:
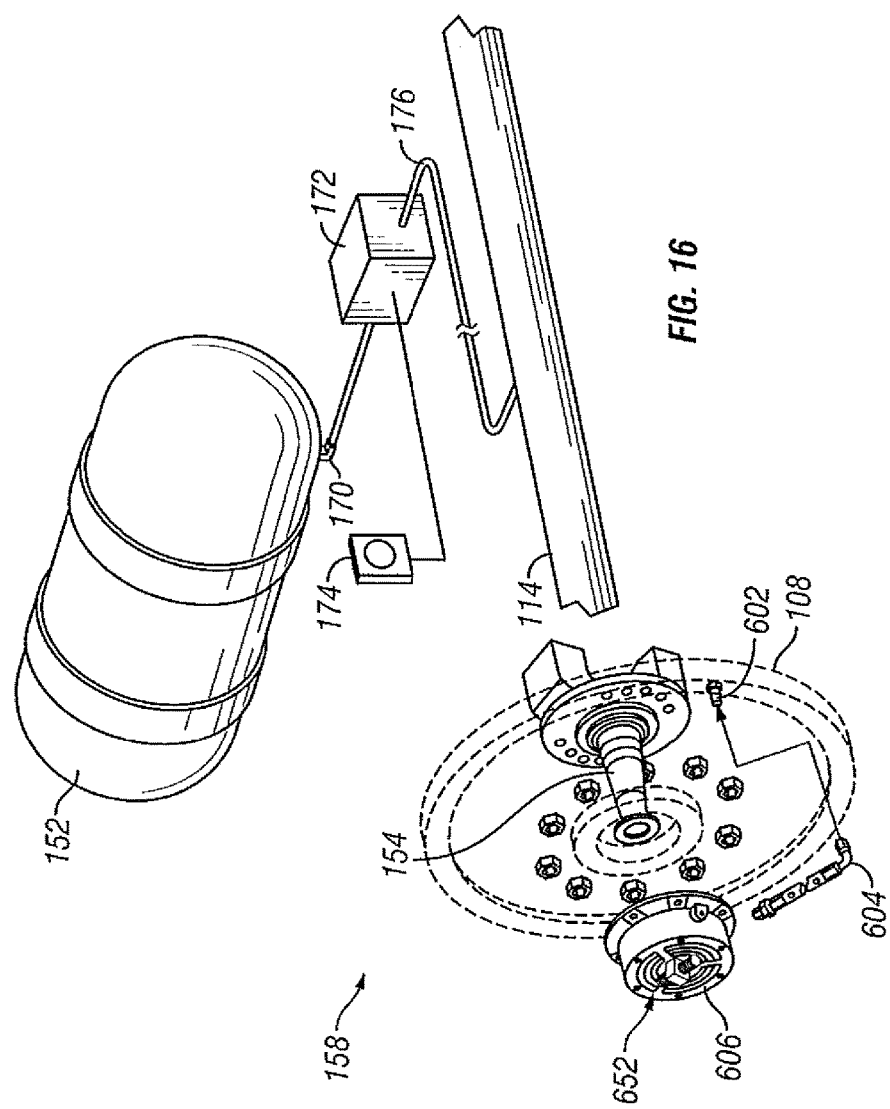
FIG. 16 illustrates a partially exploded view of one embodiment of a steer-axle high-temperature warning system with an automatic tire inflation system.
Figure 17:
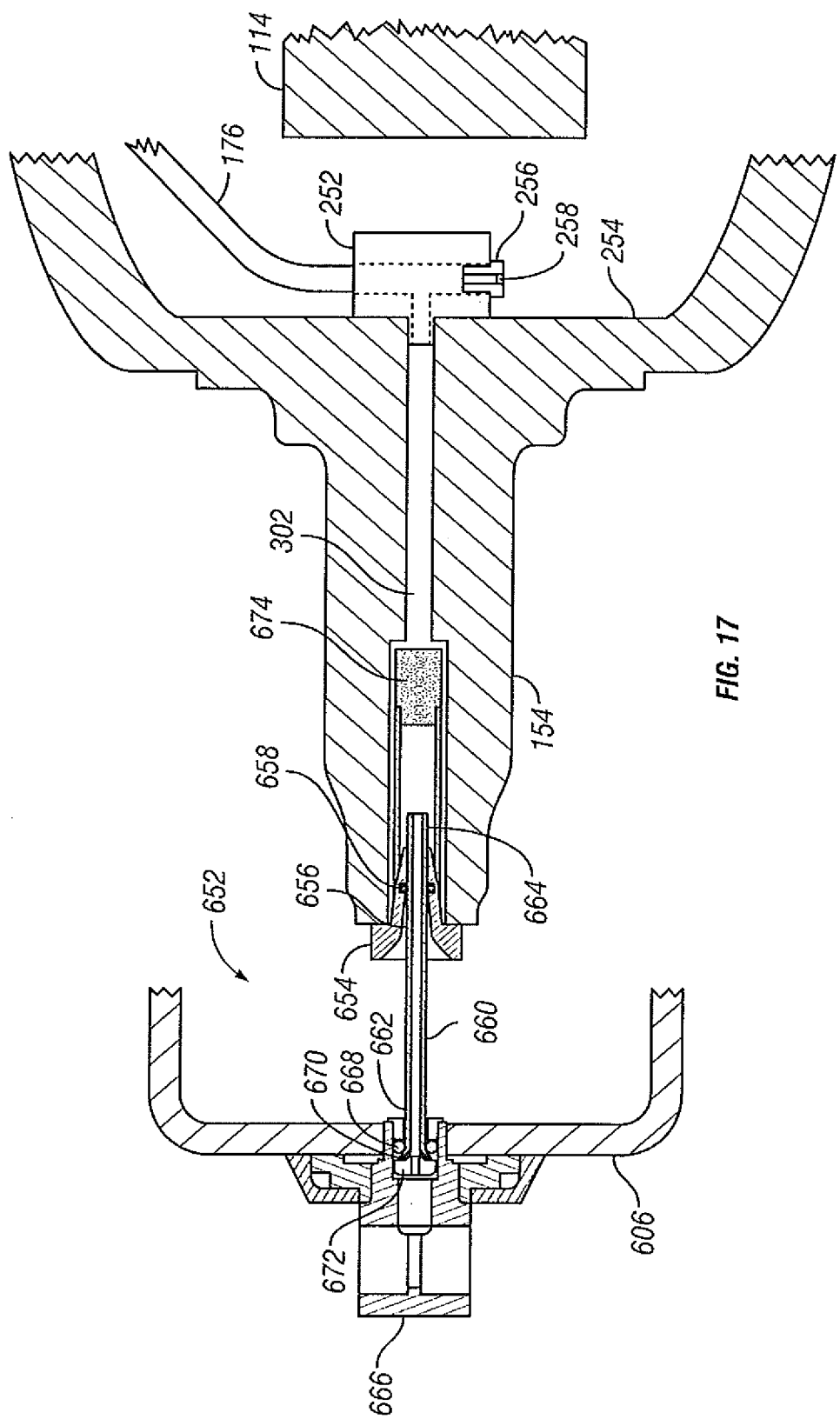
FIG. 17 illustrates a cut-away side view of another embodiment of a steer-axle high-temperature warning system with an automatic tire inflation system.

Now referring to FIGS. 16-17, a rotary union 652 may be provided for supplying air from an air pressure supply 152 in an automatic tire inflation system through air hoses 604 to the rotating tires (not shown) mounted to wheels 108. A hub cap 606 may be provided at each end of the wheel spindle 154 for retaining lubricant in the wheel bearings (not shown). An air conduit 176 may supply air to the rotary union 652 through an axial channel 302 in the wheel spindle 154. The rotary union 652 may be supported and positioned in the center end of the wheel spindle 154, and may sealingly engage the interior of the wheel spindle 154 if air is injected directly into the axial channel 302 of the wheel spindle 154.

As shown more particularly in FIG. 17, the rotary union 652 may have a first stationary part 654 or stator having a passageway 656 therethrough. The first stationary part 654 may include a filter 674 to remove debris that may be carried through the axial channel 302. The passageway 656 may be in fluid communication with the air pressure supply 152 through air conduit 176 and, in some embodiments, a valve block 252. A first rotary seal 658 may be supported in and encircle the passageway 656. The rotary union 652 may include a rotatable part including a tubular member 660 having a first end 662 and a second end 664. The second end 664 of the tubular member 660 may be coaxially extendable through and longitudinally and rotationally movable in the passageway 656, and may sealably engage the first rotary seal 658 and so as to allow sealed fluid communication with the air pressure supply 152. The first end 662 of the tubular member 660 may be rotatably and sealably connected through a second rotary seal 668 to an air connection 666 or tee-body mounted on the hub cap 606. The air connection 666 may be provided on the hub cap 606 for communicating air to the tire or tires 110 (seen in FIG. 1) via an air hose 604 (seen in FIG. 16) connected to the wheel valves 602 (seen in FIG. 16). The first end 662 of the tubular member 660 may include a shoulder 670 that co-acts with a bearing 672. In operation, air may be supplied through the stationary part of the rotary union 652. The hub cap 606 and air connection 666 may rotate with the wheels 108 relative to the wheel spindle 154. Air may flow from the pressure supply 152 through the filter 674 into the stationary part 654 of the rotary union 652. Air may flow from the stationary part 654 through the tubular member 660 to the tee-body 666. Air may flow from the tee-body 666 through air hoses 604 and tire valves 602 into the tires. Of course, if the automatic tire inflation system provides for tire deflation, air may flow in the reverse direction as that just described.

Thus, the automatic tire inflation system of FIGS. 16-19 may include an air pressure supply 152 and a suitable warning system comprising a flow switch 172 and a warning system light 174, all of which may be used as part of a high temperature warning system as disclosed herein. The use of a normally-closed valve 256 at a location near the wheel bearings 158 and 178 or brake area on the wheel spindle 154 may provide a high temperature warning system. Again, if the wheel spindle 154 reaches a predetermined temperature, the normally-closed valve 256 will open, such as by the melting of a fusible plug 258 in some embodiments, releasing air from the air pressure supply 152 and actuating the warning system light 174 for notification of the operator. Of course, a warning buzzer or audible alarm may be used in place of the light 174. The operator may quickly determine whether the warning system light 174 indicates a pressure leak in the tires 110 or a high temperature problem in the wheel hub area. In some embodiments, air escaping through a channel formed in the valve 256 may provide an audible warning of high temperature conditions. The valve 256 configuration may thus serve as a warning indicator. Thus, a warning light 174 need not be used, or may be used in conjunction with human-audible or ultrasonic warning indicators.

Figure 18:
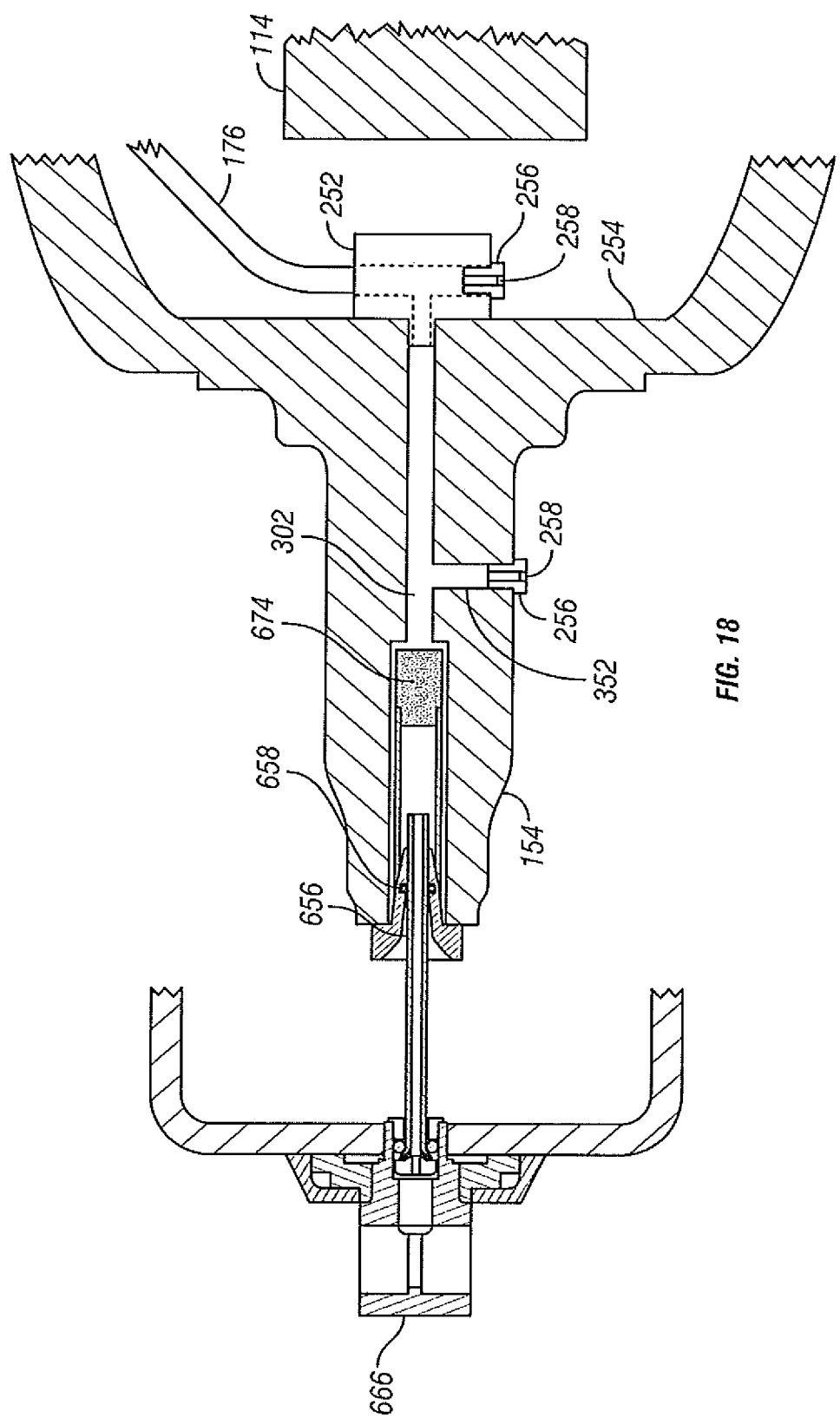
FIG. 18 illustrates a cut-away, side view of another embodiment of a steer-axle high-temperature warning system with an automatic tire inflation system.

Referring now to the embodiment of FIG. 18, shown including an automatic tire inflation system, additional normally-closed valves 256 may be provided such as in the radial channel 352. The normally-closed valve 256 may be connected to the air pressure supply 152 through the air conduit 176.

Figure 19:
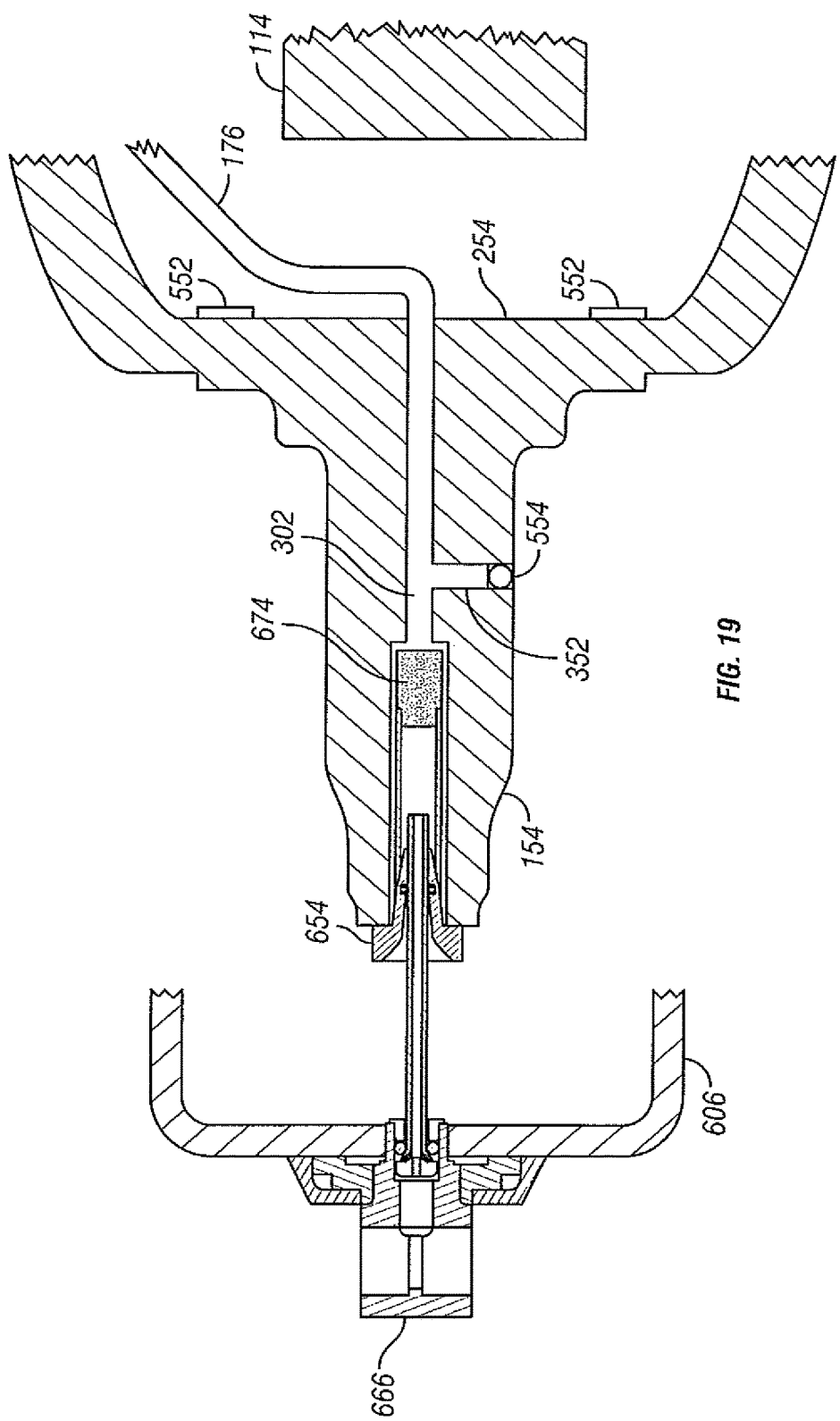
FIG. 19 illustrates a cut-away, side view of another embodiment of a steer-axle high-temperature warning system with an automatic tire inflation system.

Referring now to FIG. 19, another embodiment is shown, which includes an automatic tire inflation system, and further includes one electric-operated normally-closed valve 554 which, in this embodiment, is operable by two thermally electric switches 552 on the inner face 254 of the wheel spindle 154. The electric-operated normally-closed valve 554 may be located in a radial channel 352 so as to be adjacent the inner bearings 158 and/or outer bearings 178. Of course, the thermally electric switches may be placed at other suitable locations, such as on hubcap 606 or on stator 654.

Thus, a high-temperature warning system may be readily used in connection with an automatic tire inflation system in a similar manner and configuration as it would be used without an automatic tire inflation system. Any of the embodiments disclosed herein may be equally suitable for implementation as standalone systems or in connection with an automatic tire inflation system.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

What is claimed is:

1. A high temperature warning system for a steer-axle wheel end assembly, the system comprising:
   a steer-axle spindle having an inner face and a free end;
   a pressurized fluid supply;
   a first normally-closed valve in sealed fluid communication with the pressurized fluid supply;
   a first heat sensitive control mounted to or near the steer-axle wheel end assembly in a heat exchange relationship therewith, the first heat sensitive control being capable of opening the first normally-closed valve at a predetermined temperature; and
   a warning indicator connected to the pressurized fluid supply and actuatable upon opening of the first normally-closed valve.

2. The system of claim 1 wherein the first heat sensitive control is mounted to the steer-axle spindle.

3. The system of claim 1 wherein the first heat sensitive control is mounted to the inner face of the steer-axle spindle.

4. The system of claim 1 wherein the first heat sensitive control is mounted to the free end of the steer-axle spindle.

5. The system of claim 1 wherein the first heat sensitive control is mounted near the steer-axle spindle.

6. The system of claim 1, further comprising:
   a valve block mounted to the inner face of the spindle in a heat exchange relationship therewith, the first normally-closed valve mounted to the valve block and the pressurized fluid supply sealingly connected to the valve block in fluid communication with the normally-closed valve.

7. The system of claim 6, wherein the first heat sensitive control is mounted to the inner face of the steer-axle spindle.

8. The system of claim 6, wherein the first heat sensitive control is mounted to the free end of the steer-axle spindle.

9. The system of claim 6, wherein the first heat sensitive control is mounted to the valve block.

10. The system of claim 6, further comprising:
    the steer-axle spindle forming a channel along the central axis of the steer-axle spindle and in sealed fluid communication with the pressurized fluid supply at the inner face; and
    a second normally-closed valve mounted to the steer-axle spindle in sealed fluid communication with the pressurized fluid supply through the channel.

11. The system of claim 10, wherein the channel extends from the inner face to the free end of the steer-axle spindle, the second normally-closed valve being sealingly mounted to the channel at or near the free end of the steer-axle spindle.

12. The system of claim 10, wherein the channel extends from the inner face to an external surface of the steer-axle spindle, the second normally-closed valve being sealingly mounted to the channel at the external surface of the steer-axle spindle.

13. The system of claim 10, wherein the first heat sensitive control is disposed in the channel.

14. The system of claim 10, wherein the first heat sensitive control is mounted to the valve block.

15. The system of claim 10, further comprising:
    the first heat-sensitive control being capable of opening either or both of the first normally-closed valve and second normally-closed valve at a predetermined temperature, and
    the warning indicator actuatable upon opening either or both of the first normally-closed valve and second normally-closed valve.

16. The system of claim 10, further comprising a second heat sensitive control capable of opening the second normally-closed valve at a predetermined temperature.

17. The system of claim 16, wherein the first heat sensitive control forms part of the first normally-closed valve and the second heat sensitive control forms part of the second normally-closed valve.

18. The system of claim 17 wherein the first heat sensitive control comprises a eutectic alloy capable of melting and opening the first normally-closed valve upon reaching the predetermined temperature, and the second heat sensitive control comprises a eutectic alloy capable of melting and opening the second normally-closed valve upon reaching the predetermined temperature.

19. The system of claim 6, further comprising:
    the steer-axle spindle forming a channel along the central axis of the steer-axle spindle and extending from the inner face to the free end of the steer-axle spindle, the channel being in sealed fluid communication with the pressurized fluid supply at the inner face, and a rotary union sealingly mounted to the channel at the outer end of the steer-axle spindle, the rotary union being in sealed communication with the pressurized fluid supply and with a tire.

20. The system of claim 19, wherein the channel also extends from the inner face to an external surface of the steer-axle spindle, the system further comprising a second normally-closed valve mounted to the steer-axle spindle in sealed fluid communication with the pressurized fluid supply through the channel.

21. The system of claim 20, wherein the first heat-sensitive control is mounted to the inner face of the steer-axle spindle.

22. The system of claim 20, further comprising a second heat sensitive control capable of opening the second normally-closed valve at a predetermined temperature.

23. The system of claim 22, wherein the second heat-sensitive control is mounted to the inner face of the steer-axle spindle.

24. The system of claim 22, wherein the first heat sensitive control forms part of the first normally-closed valve and the second heat sensitive control forms part of the second normally-closed valve.

25. The system of claim 24, wherein the first heat sensitive control comprises a eutectic alloy capable of melting and opening the first normally-closed valve upon reaching the predetermined temperature, and the second heat sensitive control comprises a eutectic alloy capable of melting and opening the second normally-closed valve upon reaching the predetermined temperature.

26. The system of claim 1, further comprising:
the steer-axle spindle forming a channel along the central axis of the steer-axle spindle and in sealed fluid communication with the pressurized fluid supply at the inner face, and
the first normally-closed valve mounted to the steer-axle spindle in sealed fluid communication with the pressurized fluid supply through the channel.

27. The system of claim 26, wherein the channel extends from the inner face to the free end of the steer-axle spindle, the first normally-closed valve being sealingly mounted to the channel at or near the free end of the steer-axle spindle.

28. The system of claim 26, wherein the channel extends from the inner face to an external surface of the steer-axle spindle, the first normally-closed valve being sealingly mounted to the channel at or near the external surface of the steer-axle spindle.

29. The system of claim 26, wherein the first heat-sensitive control is mounted to the inner face of the steer-axle spindle.

30. The system of claim 26, wherein the first heat-sensitive control is disposed in the channel.

31. The system of claim 26, wherein the first heat-sensitive control is mounted to an external surface of the steer-axle spindle.

32. The system of claim 26, wherein the first heat sensitive control forms part of the first normally-closed valve.

33. The system of claim 32, wherein the first heat sensitive control comprises a eutectic alloy capable of melting and opening the first normally-closed valve upon reaching the predetermined temperature.

34. The system of claim 26, wherein the channel extends from the inner face to the free end of the steer-axle spindle, the channel being in sealed fluid communication with the pressurized fluid supply at the inner face, and wherein the channel also extends from the inner face to an external surface of the steer-axle spindle, the system further comprising:
a second normally-closed valve mounted to the steer-axle spindle in sealed fluid communication with the pressurized fluid supply through the channel; and
a rotary union sealingly mounted to the channel at outer end of the steer-axle spindle, the rotary union being in sealed communication with the pressurized fluid supply and with a tire.

* * * * *